May 16, 1939.  P. W. HUSSEY  2,158,939
SUPPORTING HORSE
Original Filed Aug. 17, 1933
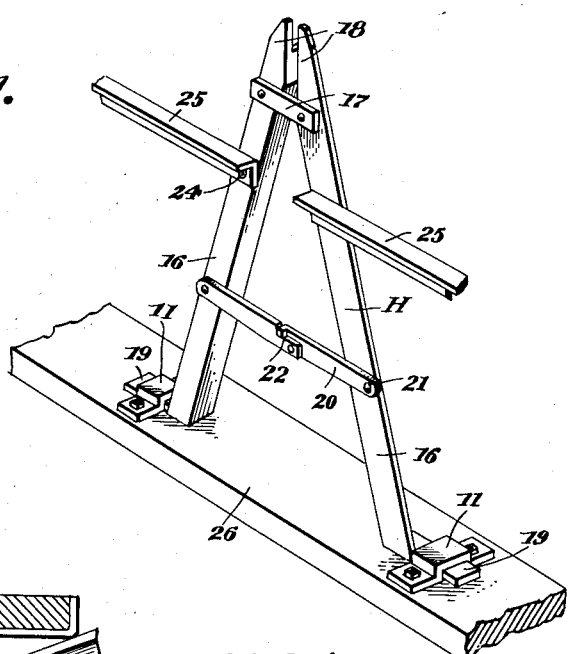
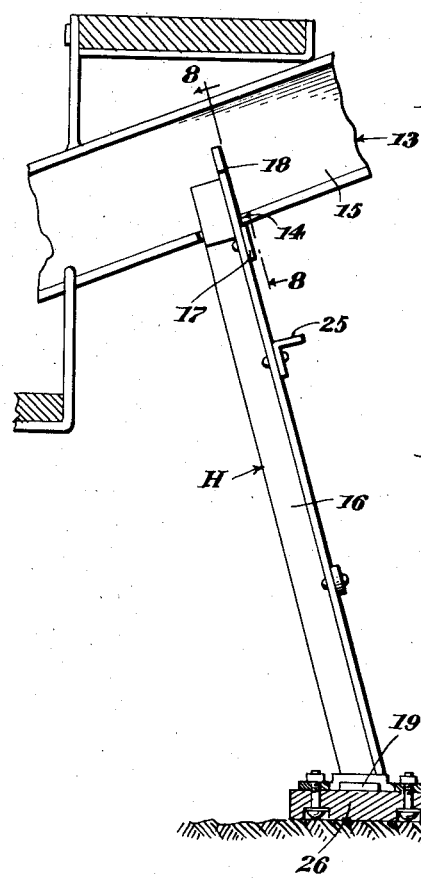
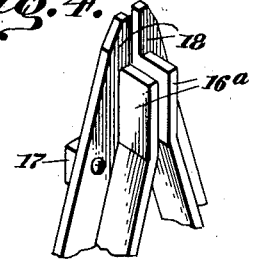
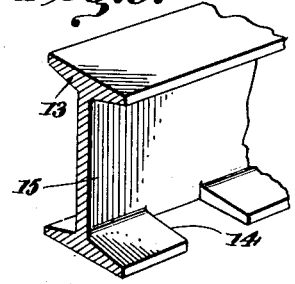
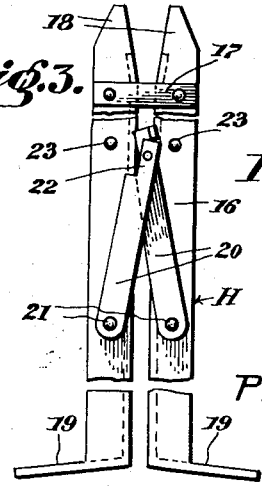
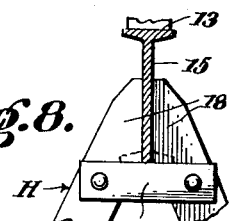
Inventor
PHILIP W. HUSSEY Patented May 16, 1939

2,158,939

UNITED STATES PATENT OFFICE 2,158,939

SUPPORTING HORSE

Philip W. Hussey, North Berwick, Maine

Original application August 17, 1933, Serial No. 685,607. Divided and this application October 17, 1935, Serial No. 45,483

1 Claim. (Cl. 189—1)

This invention relates to supporting horses particularly adapted for use in connection with portable bleachers and has for its principal object the production of a simple and efficient collapsible supporting horse which may be readily placed in a set-up position and which will constitute an efficient support and brace for the beams or stringers of the portable bleachers of the type disclosed in my previous application relating to portable bleachers, filed August 17, 1933, Serial Number 685,607, of which this application is a division.

A further object of this invention is the production of a simple and efficient supporting horse for tying the beams and sleepers of portable bleachers firmly together.

A still further object of this invention is the production of an A type supporting horse wherein the weight upon the horse will cause the horse to more tightly grip the beam and sleeper to which the horse is attached.

Other objects and advantages of this invention will appear throughout the following specification and claim.

In the drawings:

Figure 1 is a perspective view of the supporting horse in a set-up position;

Figure 2 is a side elevation of the supporting horse in a set-up position, the sleeper and the seat and a portion of the footboard carried by the beam being shown in section;

Figure 3 is a front elevation of the supporting horse in a folded position, certain parts being broken away;

Figure 4 is a perspective view of the upper end of the horse, looking at the rear face thereof;

Figure 5 is a sectional perspective view of a portion of one of the beams which is adapted to be supported by the horse;

Figure 6 is an enlarged front elevation of a portion of one of the legs of the horse showing the manner in which the lateral braces are connected therewith;

Figure 7 is a vertical section taken on line 7—7 of Figure 6; and

Figure 8 is a section taken on line 8—8 of Figure 2.

By referring to the drawing, it will be seen that H designates the supporting horse which is adapted to preferably support an I beam or stringer 13 of the type shown in my application Serial Number 685,607. This I beam 13 may be notched, as at 14, at its base to allow the upper end of the horse H to grip the web portion 15 of the beam 13. A plurality of these horses H are used in constructing the portable bleachers, but since the present invention relates to the structure of horse, the description will be directed to the structural features of the horse.

The horse H comprises a pair of preferably angle-iron legs 16 which are pivotally connected to a connecting link or plate 17, shown in Figure 1, this connecting link 17 being preferably secured to the legs 16 near the upper ends thereof, the legs 16 being provided with projecting stringer gripping jaws 18, as shown in Figure 4, whereby the jaws 18 will firmly grip upon opposite sides of the stringer 13, and firmly lock the legs 16 in firm engagement with the stringer 13. The legs 16 preferably diverge toward their lower ends and these legs 16 are provided with laterally bent securing feet 19 which extend under the straps 11, as clearly shown in Figure 1. The legs 16 are also braced by means of the pivoted toggle links 20 which are pivotally secured, as at 21, to the legs 16 and are provided with a toggle or break joint 22 at their connecting ends to constitute an efficient toggle break for holding the legs 16 in a properly spaced relation when the horse H is in a set-up position.

Securing pins 23 are carried by the legs 16 near their upper ends for fitting into the slots 24 formed in the ends of the connecting spacing braces 25 which may be secured to the legs 16, as shown in Figures 1 and 6, and constitute means for attaching the horse H to a spaced similarly constructed horse arranged in lateral spaced relation thereto. These bracing members or spacing braces 25 will constitute a very efficient means for bracing the horse H near its upper end against lateral strain, and will provide a connecting means between the laterally spaced horses as will be apparent when considering my previous application Serial Number 685,607.

As shown in Figures 1 and 2, the feet 19 extend under the straps 11 which are carried by the sleeper 26, which sleeper is adapted to rest on the ground and may be anchored in any desired manner. It will be obvious that the more weight which is placed upon the upper end of the horse H, the more tightly the jaws 18 will grip the stringer or beam 13 in a biting action, and the more tightly the feet 19 will be forced under the straps 11, thereby firmly holding the horse H in anchored engagement with the stringer or beam 13 and the sleeper 26. Since the stringer or beam 13 is preferably notched, as at 14, the upper end of the horse will be anchored against shifting movement longitudinally of the beam or stringer 13 and the braces 25 will laterally brace the horse and constitute a means for connection with similar horses at opposite sides thereof.

The base portion of the stringer 13 is adapted to rest upon the upper edge of the plate or link 17 and the weight of the stringer upon the upper edge of this plate is adapted to cause the jaws 18 to more firmly bite against the web portion 15 of the stringer 13. The legs 16, as stated above, are formed of an angle-iron structure, and the rear flange portion 16ª of each arm extends for a portion of the length of the jaws 18 to provide a wide gripping face against the web 15, note Figures 2 and 4.

Having described the invention, what I claim as new is:

As a new article of manufacture, a supporting horse comprising legs formed of angle metal to provide each leg with a front flange and a side flange along its inner side edge, the upper end portions of the legs having their inner edges extending diagonally to provide jaws, lower portions of the side flanges being extended beyond the legs and bent transversely to provide flat feet extending laterally of the legs back of the front flanges and projecting from outer side edges thereof for engagement with anchoring means of a support, a plate extending transversely of said legs between the upper portions thereof with its ends overlapping the front flanges of the legs and pivotally secured thereto at lower ends of said jaws, and toggle links extending between the legs transversely thereof and pivotally secured to the front flanges thereof in spaced relation to lower ends of the legs.

PHILIP W. HUSSEY.